(12) United States Patent
Thelen et al.

(10) Patent No.: US 9,314,034 B2
(45) Date of Patent: Apr. 19, 2016

(54) APPARATUS FOR PRODUCING A SAUSAGE STRING

(71) Applicant: VEMAG Maschinenbau GmbH, Verden/Aller (DE)

(72) Inventors: Christoph Thelen, Heidenau (DE); Thorsten Meininger, Verden (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 14/268,368

(22) Filed: May 2, 2014

(65) Prior Publication Data

US 2014/0329449 A1    Nov. 6, 2014

(30) Foreign Application Priority Data

May 3, 2013    (DE) ..................... 20 2013 004 093 U

(51) Int. Cl.
*A22C 11/00*    (2006.01)
*A22C 11/02*    (2006.01)

(52) U.S. Cl.
CPC ............. *A22C 11/02* (2013.01); *A22C 11/0209* (2013.01)

(58) Field of Classification Search
USPC ........................ 452/30–35, 51, 21–26, 46–48
See application file for complete search history.

(56) References Cited

U.S. PATENT DOCUMENTS

| | | | | |
|---|---|---|---|---|
| 1,545,586 A | * | 7/1925 | Kruse ............................... | 452/47 |
| 2,651,808 A | * | 9/1953 | Burnett et al. .................. | 99/441 |
| 2,686,128 A | * | 8/1954 | Conti ............................. | 426/420 |
| 3,396,426 A | * | 8/1968 | Ziolko ............................ | 452/31 |
| 3,545,035 A | * | 12/1970 | Piereder ......................... | 452/31 |
| 3,699,877 A | * | 10/1972 | Criss et al. ....................... | 99/534 |
| 3,744,784 A | * | 7/1973 | Vaessen ......................... | 269/47 |
| 4,060,875 A | * | 12/1977 | Gosling et al. .................. | 452/31 |
| 4,418,447 A | * | 12/1983 | Ziolko ............................ | 452/46 |

(Continued)

FOREIGN PATENT DOCUMENTS

| | | |
|---|---|---|
| DE | 60218513 T2 | 11/2007 |
| EP | 1371293 A1 | 12/2003 |

(Continued)

OTHER PUBLICATIONS

German Patent Office, Search Report issued in application No. 20 2013 004 093.9 dated Feb. 7, 2014.

(Continued)

*Primary Examiner* — Richard Price, Jr.
(74) *Attorney, Agent, or Firm* — Wood, Herron & Evans, LLP

(57) ABSTRACT

Apparatus and methods for producing a string from a pasty material comprising at least an extrusion head which has at least one conveyor conduit for the pasty material to be shaped into a string, wherein the conveyor conduit has an inlet and an outlet, and which has a receiving chamber for a casing material to be applied to the string, wherein the receiving chamber has an entry for the casing material and an exit for applying the casing material to the string surface. Arranged downstream of the extrusion head in the conveyor direction is a deflection device adapted to put the string covered with casing material into a predetermined curvature. The pasty material is pressed to form a string of predetermined length and then the string is covered at least with a pasty material, wherein the string covered with the casing material is deflected through a predetermined angle.

18 Claims, 3 Drawing Sheets

(56) References Cited

U.S. PATENT DOCUMENTS

| | | | |
|---|---|---|---|
| 4,420,856 A * | 12/1983 | Ziolko | 452/46 |
| 4,880,105 A * | 11/1989 | Kasai et al. | 198/465.4 |
| 4,972,548 A * | 11/1990 | Townsend et al. | 426/138 |
| 5,019,012 A * | 5/1991 | Townsend et al. | 452/46 |
| 5,183,433 A * | 2/1993 | Townsend et al. | 452/51 |
| 5,514,029 A * | 5/1996 | Schutz | 452/35 |
| 5,921,857 A * | 7/1999 | Simpson | 452/31 |
| 5,993,307 A * | 11/1999 | Hamblin | 452/35 |
| 6,071,186 A * | 6/2000 | Shibata et al. | 452/51 |
| 6,146,540 A * | 11/2000 | Nakamura et al. | 210/745 |
| 6,245,369 B1 * | 6/2001 | Kobussen et al. | 426/231 |
| 6,290,591 B1 * | 9/2001 | Hergott et al. | 452/51 |
| 7,040,975 B2 * | 5/2006 | Shefet et al. | 452/51 |
| 7,157,039 B2 | 1/2007 | Bortone | |
| 7,160,184 B1 * | 1/2007 | Lebsack et al. | 452/177 |
| 7,166,020 B2 * | 1/2007 | Van De Wal | 452/32 |
| 7,618,307 B2 * | 11/2009 | Gladh | 452/51 |
| 2004/0089968 A1 | 5/2004 | Bortone | |
| 2012/0321752 A1 | 12/2012 | Van De Nieuwelaar et al. | |

FOREIGN PATENT DOCUMENTS

| | | |
|---|---|---|
| WO | 9922600 A1 | 5/1999 |
| WO | 03024234 A1 | 3/2003 |
| WO | 03034828 A1 | 5/2003 |
| WO | 2006072735 A1 | 7/2006 |
| WO | 2011029435 A1 | 3/2011 |

OTHER PUBLICATIONS

European Patent Office, Search Report issued in application No. 14166669.3 dated Oct. 6, 2015 (8 pages) and English Translation (4 pages).

\* cited by examiner

APPARATUS FOR PRODUCING A SAUSAGE STRING

BACKGROUND

The present invention relates to apparatus and methods for producing a string of a pasty material, such as sausagemeat or the like products.

The invention concerns, in particular, an apparatus for producing a sausage string comprising at least an extrusion head which has at least one conveyor conduit for the pasty material to be shaped into a string, wherein the conveyor conduit has an inlet and an outlet, and which has a receiving chamber for a casing material to be applied to the string, wherein the receiving chamber has an entry for the casing material and an exit for applying the casing material to the string surface.

Apparatuses and methods of the above-indicated general kind are usually employed to produce sausage strings or individual sausages whose outer casing is made from collagen or alginate instead of a natural skin. The pasty material, preferably sausagemeat or the like meat-bearing products, is usually kept in readiness in a filling hopper of a sausage production machine like, for example, a filling machine and is processed by way of an extrusion head to provide a sausagemeat string, which is preferably continuously conveyed and is thus uniform. To impart a desired strength to the sausagemeat string and thus to prevent unwanted breakage of the string or to achieve a simplification in further processing by, for example, a dividing device which individually separates the sausages from the string, there is applied to the string surface a casing material like for example collagen or alginate. Collagen and alginate are materials which are capable of flow and which after being applied to the string surface set after a short period of time and form a firm casing on the sausagemeat string. To expedite setting of the casing material applied to or disposed on the string surface and thus to simplify further processing of the string of pasty material, the casing material, which now constitutes the outside surface of the string, is brought into contact with an application agent for causing the casing material to set. The casing material is caused to set in a very short time by the application agent which includes, for example, a calcium solution and thus a relatively firm case is formed around the sausagemeat string.

Known apparatuses have at least an extrusion head with at least one conveyor conduit for the pasty material to be shaped into a string. The conveyor conduit is provided with an inlet for the still unshaped, pasty material and an outlet for the material which is then shaped within the conveyor conduit to give a string. The outlet for the casing material to be applied to the surface of the string is associated with the end region of the conveyor conduit. In addition, the apparatuses for producing a string from a pasty material, which are known for example from EP 1 371 293 B1 or WO 99/22600 A, have an applicator device for applying an application agent for causing the casing material to set to the sausage string, the applicator device being arranged downstream of the extrusion head in the conveyor direction. The applicator device is frequently arranged immediately downstream of the extrusion head so as to cause the casing material to set at an early time and related thereto short to even no waiting times are to be tolerated for further processing. EP 1 371 293 B1 discloses for example the provision of an applicator device comprising a pipe which is wound to form a coil and with which an annular shower is formed for the sausage string which is passed through the free cross-section of the wound pipe conduit. The sausages produced with the known apparatuses and processes always involve a straight orientation after production. The sausages produced can admittedly be shaped without any problem, but they always return to their straight orientation if the force acting on the sausages is removed. In contrast to strings of sausages which are filled using natural skins, sausages which are of a straight configuration of that kind lack the natural curved shape.

SUMMARY

An object of the invention is to provide apparatus and methods for producing a string from a pasty material, with which a configuration of the string and the sausages produced therefrom, that is similar to a natural skin case, is achieved.

In an apparatus of the above-indicated general kind, the object of the invention is attained in that arranged downstream of the extrusion head in the conveyor direction is a deflection device adapted to put the string covered with casing material into a predetermined curvature. The deflection device, according to the embodiments of the invention, is adapted to guide the string covered with casing material, after the string has issued from the extrusion head, along a predetermined curved path portion. While the string is guided along the curved path portion, it sets. Thus, it is easily possible to produce curved strings which are further processed to give curved sausages.

The invention is based on the realization that, while the string is guided along a predetermined curved path portion, it is possible to provide for setting of the collagen or alginate used as the casing material so that the sausage string or the individual separated-off sausages, without a tensile loading on their ends, are of a curved shape which is very similar to a sausage with a natural skin casing. The casing material which is hardened in the curved condition of the string means that the string and the sausages produced therefrom preferably acquire a shape memory. Even if the sausages are pulled straight or stretched out, they return to their curved or bent starting shape when the force is removed.

Preferably, in an embodiment of the invention, the deflection device has a curved pipe conduit portion. The use of a curved pipe conduit portion represents a structurally advantageous option in regard to the design configuration of the deflection device. With a curved pipe conduit portion, the string which issues from the extrusion head and to the outside surface of which the casing material preferably comprising alginate or collagen is applied can be advantageously guided along a curved path portion and can provide a curvature of the string.

Preferably, the curvature of the pipe conduit portion is of an angle of at least 45° whereby the string issuing from the extrusion head is curved through a sufficient angle and, thus, a sufficiently long path portion is produced, which is enough for hardening of the casing material. Preferably, the pipe conduit portion has a curvature of at least about 270°, thereby ensuring that, for further processing thereof, the string produced from pasty material is only converted into a straight orientation again when the casing material is preferably hardened on the string surface. That advantageously prevents the string from unintentionally stretching back again, with a string surface which is still unhardened.

Preferably, a development provides that the pipe conduit portion is of a coil-shaped or helical configuration. With a pipe conduit portion of a coil or helical configuration, deflection of the sausage string can be implemented in an advantageously simple fashion along the predetermined curved path, while at the same time this provides that the amount of space required is advantageously small, with the preferably helical configuration of the pipe conduit portion. The helical pipe conduit portion used preferably involves a complete turn through 360° so that the directions of the pipe entry and the pipe exit are oriented parallel to each other, but extend at different heights. The pipe conduit portion is preferably of a one-piece configuration.

Alternatively, an embodiment of the invention provides that, instead of a helical pipe conduit portion, a pipe conduit portion is used formed from two pipe portions whose curvature configurations extend in planes which are approximately perpendicular to each other. Such a configuration of the pipe conduit portion makes it possible to produce any desired predetermined curved path portions through which the sausage string which is covered with the casing material and which has possibly already been brought into contact with the application agent for setting the casing material passes until the casing material hardens. The pipe conduit portion used to provide the curved pipe portion can be arranged in directly adjoining relationship with the outlet of the extrusion head. Alternatively, the inlet opening of the pipe conduit portion is arranged at a spacing relative to the outlet of the extrusion head.

In an embodiment of the invention, it has an applicator device for applying an application agent for causing the casing material to set to the sausage string, which is arranged downstream of the extrusion head in the conveyor direction. It is possible in that way to specifically influence the casing material setting process. The application agent for hardening the casing material is applied to the sausage string surface by means of the applicator device, which is preferably arranged along a portion of the deflection device. In that case, the applicator device is desirably arranged in a portion of the deflection device in such a way as to ensure that, on issuing from the deflection device, the casing material is hardened or set and, thus, the shape thereof can advantageously be admittedly temporarily altered but can no longer be permanently changed.

Preferably, the applicator device is disposed in the first half, preferably in the first third, of the deflection device, thereby advantageously guaranteeing that the solidifying application agent is already applied to the casing material just before the string enters in the pipe conduit portion and thus setting of the casing material is implemented until the string issues from the pipe conduit portion. A possible embodiment of the invention provides that the applicator device is arranged directly downstream of the entry opening of the pipe conduit portion so that the hardening process is preferably effected over almost the entire length of the curved pipe conduit portion. Arranging the applicator device at the deflection device also ensures that the string of sausages has firstly adopted its predetermined curvature shape and the collagen or alginate preferably used as the casing material is compressed or stretched in a manner corresponding to the position on the surface of the sausage string before the application agent is brought into or comes into contact with the casing material.

The applicator device is preferably in the form of a spray device for the application agent for setting the casing material on the string, this representing an advantageously simple option in regard to the design configuration of the applicator device. The preferably fluid application agent can preferably be uniformly applied to the surface of the string, that is now formed by the casing material, by way of a spray device. The spray device preferably has at least one nozzle projecting on the inside of the pipe conduit portion for applying the application agent to the sausage string as it is guided through the pipe conduit portion. The applicator device preferably has a plurality of applicator nozzles distributed uniformly around the periphery.

An embodiment of the invention provides that the application agent includes at least a calcium solution, by means of which the application agent is hardened or solidified on the surface of the sausage string in a relatively short time so that speedy further processing of the sausage string is possible, by for example dividing sausage portions from the sausage string.

Preferably, the exit from the receiving chamber is associated directly with the outlet from the conveyor conduit so that the sausage string is advantageously coated with the casing material immediately after issuing from the outlet of the conveyor conduit. In addition, the direct association of the exit from the receiving passage with the outlet of the conveyor conduit provides a structurally advantageous option for the necessary coating of the string of pasty material, over its full periphery. Preferably, the receiving chamber extends along at least a portion of the conveyor conduit, wherein the inner chamber wall of the receiving chamber is formed by means of a conveyor conduit portion. The receiving chamber preferably forms an annular space around the conveyor conduit. The inner chamber wall of the receiving chamber for the filling material also ends with the end of the conveyor conduit.

In a further embodiment of the invention or in a preferred embodiment of the invention, the exit is an annular gap which extends in the axial direction between the end portion of the conveyor conduit and a wall portion of the receiving chamber, that is arranged at a spacing relative thereto and extends in the radial direction, wherein the annular gap is preferably of an irregular gap dimension in the peripheral direction. That advantageously ensures that the casing material is preferably applied over the full periphery to the surface of the string issuing from the conveyor conduit. Alternatively, the annular gap at the end around the conveyor conduit involves a regular gap dimension whereby the casing material is applied in a uniform layer thickness to the surface of the sausage string. To improve application to the surface of the string, it can be provided that the wall portion of the receiving chamber, which delimits the receiving chamber at the end thereof, projects in the axial direction beyond the end of the conveyor conduit and at the same time also narrows inwardly in the radial direction. In that way, the casing material is in a preferred direction relative to the surface of the sausage string on issuing from the annular gap.

A preferred embodiment of the invention provides that the annular gap is of an irregular gap dimension in the peripheral direction, wherein the largest and the smallest dimensions of the annular gap are correspondingly associated with the inside and outside radius of the curved pipe conduit portion. Preferably, the largest gap dimension is associated with the outside radius and the smallest gap dimension is associated with the inside radius so that, after the sausage string issues and after the casing material is applied to the surface thereof, upon deflection thereof and related bending of the sausage string, the casing material on the surface of the sausage string is compressed or upset in the region of the inside radius and stretched in the region of the outside radius. The curved sausage string produced is therefore of a preferably almost uniform layer thickness in the peripheral direction after the casing material has set.

In a further independent embodiment or in accordance with another embodiment of the invention, the conveyor conduit has an outlet and the receiving chamber has an exit, whose outlet and exit openings respectively are oriented at an angle less than or greater than 90° relative to the center line of the conveyor conduit. In that way, the sausage string which issues from the apparatus is immediately deflected in direction. The angle at which the sausage string already covered with casing material issues from the extrusion head is preferably in a range of between 5° and 25° relative to the center line of the conveyor conduit which is arranged upstream in the conveyor axis. The curved pipe conduit portion, with which the sausage string is deflected and along which the applicator device for the application agent is arranged on an upstream portion thereof, is preferably connected directly to the outlet opening of the extrusion head, thereby providing for immediate transfer of the sausage string out of the extrusion head into the deflection device.

A particularly preferred embodiment of the invention provides a filling machine for producing sausages from a pasty material, such as sausagemeat or the like, comprising a filling hopper and a delivery pump coupled to an apparatus for producing a string from the pasty material. This embodiment of the invention is based on the realization that a filling machine for producing sausages of pasty material with an apparatus designed according to the invention in that way for producing a string or sausages with a casing of alginate or collagen can produce sausages which are of a curved shape as otherwise only sausages which have a natural skin casing have. With the natural skin-like shape, the sausages produced are of an appearance which is attractive to the customer and which the sausages preferably also retain upon preparation thereof.

A preferred embodiment of the invention provides that the filling machine includes at least one dividing device for dividing the shaped string covered with the casing material into individual string portions. That ensures an advantageously simple possible way of subdividing the string produced, into individual portions. Preferably, the dividing device used is a twisting-off or cutting-off device, by means of which the string portions forming the later sausages can be reliably respectively divided from the string.

The object of the invention is further attained by a process for producing at least one string of a pasty material, such as sausagemeat or the like, in which the pasty material, in particular sausagemeat, is pressed into a string of predetermined length, and then the string is covered at least with a casing material, wherein it is provided that the string covered with the casing material is deflected through a predetermined angle.

With a process in accordance with the invention in that way, a string comprising a pasty material or individual string portions forming sausages which are cut to length can in an advantageously simple fashion be put into a curved configuration which is similar to the configuration of a string of a pasty material which was introduced into a natural skin casing. Accordingly, the sausage string or the individual sausages acquire a visual appearance which is attractive to a consumer. Preferably, an application agent for hardening the casing material is applied to the string surface during the deflection process.

Preferably, the string of pasty material is deflected through an angle of at least 45° in order to ensure that the application agent applied to the casing material had a sufficiently long time to act for hardening of the casing material. Preferably, the string covered with the casing material is deflected at least through an angle of about 270° before the sausage string is put into a straight or stretched orientation.

During the deflection process, an application agent for hardening the casing material is applied to the string surface which is formed by casing material. In that case, the application agent is preferably applied to the casing material enclosing the string directly at the beginning of the string deflection process, whereby the process of hardening the casing material on the surface of the sausage string is improved. Preferably, the casing material is applied with an irregular layer thickness to the surface of the sausage string in the peripheral direction thereof. The deflection process and the bending of the sausage string, that this involves, results in compression of the sausage string at the inside radius thereof and stretching of the sausage string at its outside radius. Casing material applied in those regions of the sausage string is also stretched or compressed respectively in the same fashion. The irregular application of the casing material over the periphery of the string is intended to compensate for stretching and compressing of the casing material in the predetermined surface regions so that a curved finished string or a respective string portion of a curved configuration then in turn has a uniform layer thickness at the casing material.

BRIEF DESCRIPTION OF THE SEVERAL VIEWS OF THE DRAWINGS

The invention is described in greater detail hereinafter by means of a possible embodiment by way of example with reference to the accompanying Figures.

DETAILED DESCRIPTION

Figure 1:
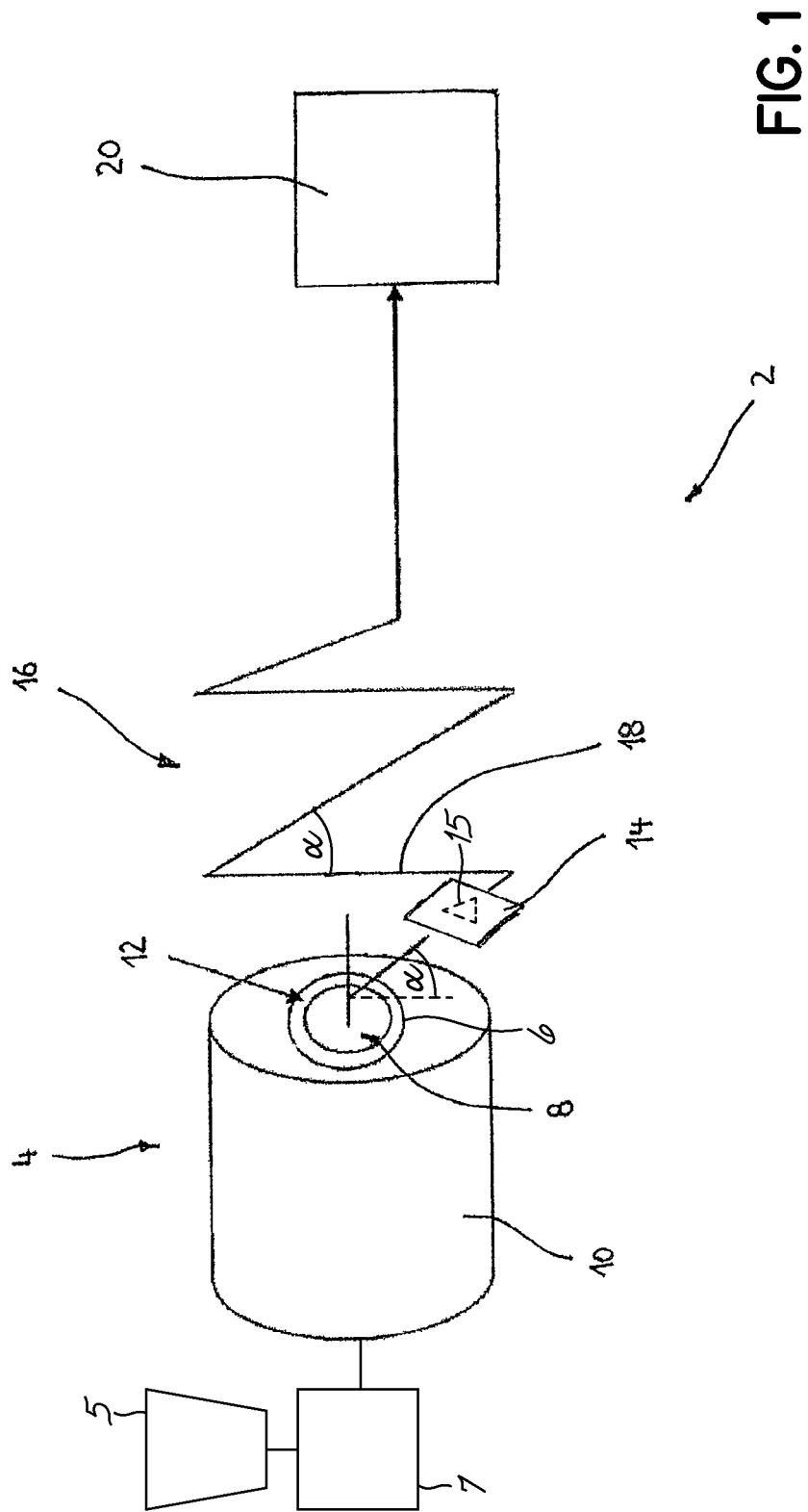
FIG. 1 shows a diagrammatic view of an apparatus according to the invention for producing a string.

FIG. 1 shows an apparatus 2 for producing a string from a pasty material, such as sausagemeat or the like, having an extrusion head 4 with a conveyor conduit 6 for the pasty material to be formed into a string. The conveyor conduit 6 has an inlet (not shown) and an outlet 8, wherein the pasty material shaped in the form of a string, also referred as the sausage string, issues from the extrusion head 4 by way of the outlet 8.

The extrusion head 4, more precisely the conveyor conduit 6 for the material, is coupled to a filling machine so that the material to be shaped is introduced into the extrusion head 4 from the filling machine. The filling machine in per se known manner has a filling hopper 5, a delivery pump 7, and control devices.

The extrusion head 4 further includes a receiving chamber 10 for a casing material which is to be applied to the surface of the sausage string and which then constitutes the outer layer of the sausage string. A kind of co-extrusion head is formed in that way. The receiving chamber 10 for receiving the casing material encloses in particular a portion of the conveyor conduit 6 and is preferably arranged coaxially with the center line of the conveyor conduit. The receiving chamber 10 has an exit 12 for applying the casing material, which is preferably associated with the outlet 6 of the conveyor conduit. The casing material, which preferably has for example alginate or collagen, hardens after a predetermined period of time after being applied to the surface of the sausage string and the function thereof is to harden the sausage string.

To speed up hardening of the casing material and thus to reduce the waiting time for further processing, an application agent for hardening the casing material is preferably applied to the casing material. The application agent is applied by means of an applicator device 14 which is arranged downstream of the extrusion head 4 in the conveyor direction and which is intended to ensure application of the application agent, that is distributed uniformly over the periphery and that is at the same time continuous.

In addition, a deflection device 16 is arranged on the apparatus according to the invention, downstream of the extrusion head 4 in the conveyor direction, so that the sausage string produced or the sausages later produced therefrom acquire a configuration similar to a natural skin casing. The deflection device 16 guides or deflects the sausage string covered with casing material on to a predetermined curved path until the casing material is hardened. With the hardening of the casing material, the sausage string acquires a kind of shape memory so that the sausage string and the sausages produced therefrom are bent or curved, if they are not subjected to a tensile loading in the longitudinal direction at their ends. The deflection device 16 is formed from a curved pipe conduit portion 18, the curvature of which includes an angle α of at least 45°. Preferably, the pipe conduit portion 18 has a curvature of at least 270°, thereby ensuring that the string of pasty material is put into a straight or stretched-out orientation again only after the casing material on the surface of the sausage string has set.

The pipe conduit portion 18 shown in FIG. 1 is of a coil or helical configuration, wherein the pipe conduit portion preferably involves at least one entire turn with an angle of 360°. The applicator device 14 for the application agent is arranged in the first third of the deflection device 16, the applicator device being in the form of a spray device 15 for the application agent to be applied. For further processing, after passing through the deflection device, the sausage string is fed to a dividing device 20 which continuously twists or cuts string portions of a predetermined length, off the sausage string produced.

Figure 2:
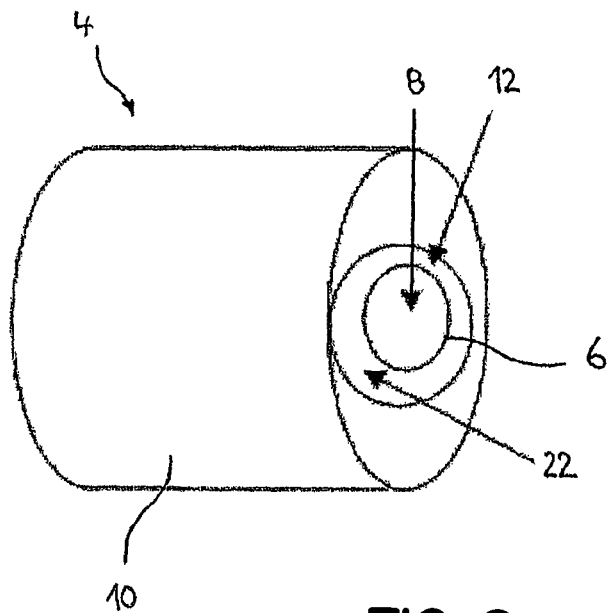
FIG. 2 shows a diagrammatic view of an extrusion head used.
Figure 3:
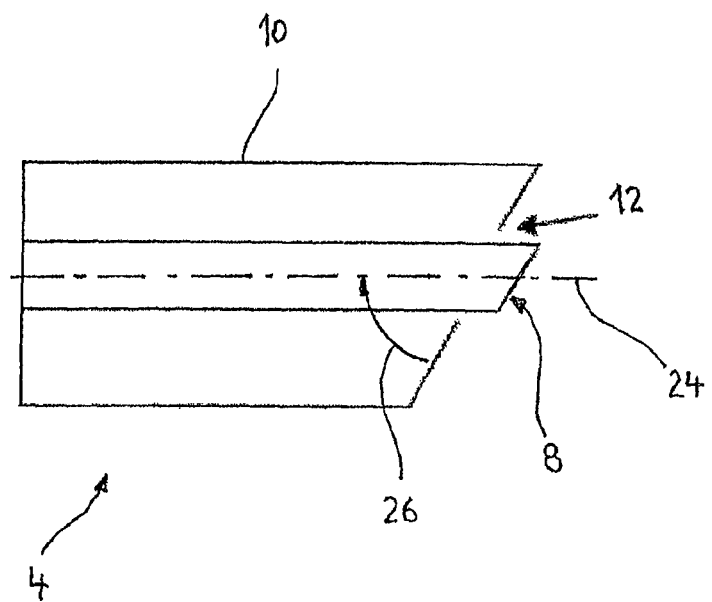
FIG. 3 shows a diagrammatic view of a further embodiment of an extrusion head in section.

FIGS. 2 and 3 show a detail view of the extrusion head 4, FIG. 2 illustrating that the exit 12 of the receiving chamber 10 is in the form of an annular gap around the end of the conveyor conduit 6, wherein the annular gap 22 is asymmetrical or involves an irregular gap dimension over the periphery. In that way, at the moment of the casing material being applied to the surface of the string of pasty material, a cover layer is produced, with a layer thickness of the casing material, that varies in the peripheral direction. The differing layer thickness is then almost compensated while the string is being passed through within the curved pipe conduit portion as the casing material is compressed in the region of the inside radius and stretched or pulled apart in the region of the outside radius.

FIG. 3 is a view in section of a further embodiment of the extrusion head, whose end region extends inclinedly relative to the center line of the conveyor conduit, and the receiving chamber 10 extending portion-wise around the conveyor conduit. The outlet 8 of the conveyor conduit 6 and the exit 12 of the receiving chamber 10 have outlet and exit openings respectively, whose planes which are formed by means of the outlet and exit openings are respectively oriented at an angle of less than or greater than 90° relative to the center line 24 of the conveyor conduit. In that way, the sausage string can be deflected through a predetermined angle indicated by the arrow 26 immediately after issuing from the extrusion head 4. The pipe conduit portion 18 arranged downstream of the extrusion head 4 in the conveyor direction is directly connected to the extrusion head 4 or is arranged at a spacing relative to the end region of the extrusion head 4. In that case, the outlet region of the extrusion head 4 is arranged in aligned relationship with the intake opening of the pipe conduit portion 18 (not shown in greater detail).

Figure 4:
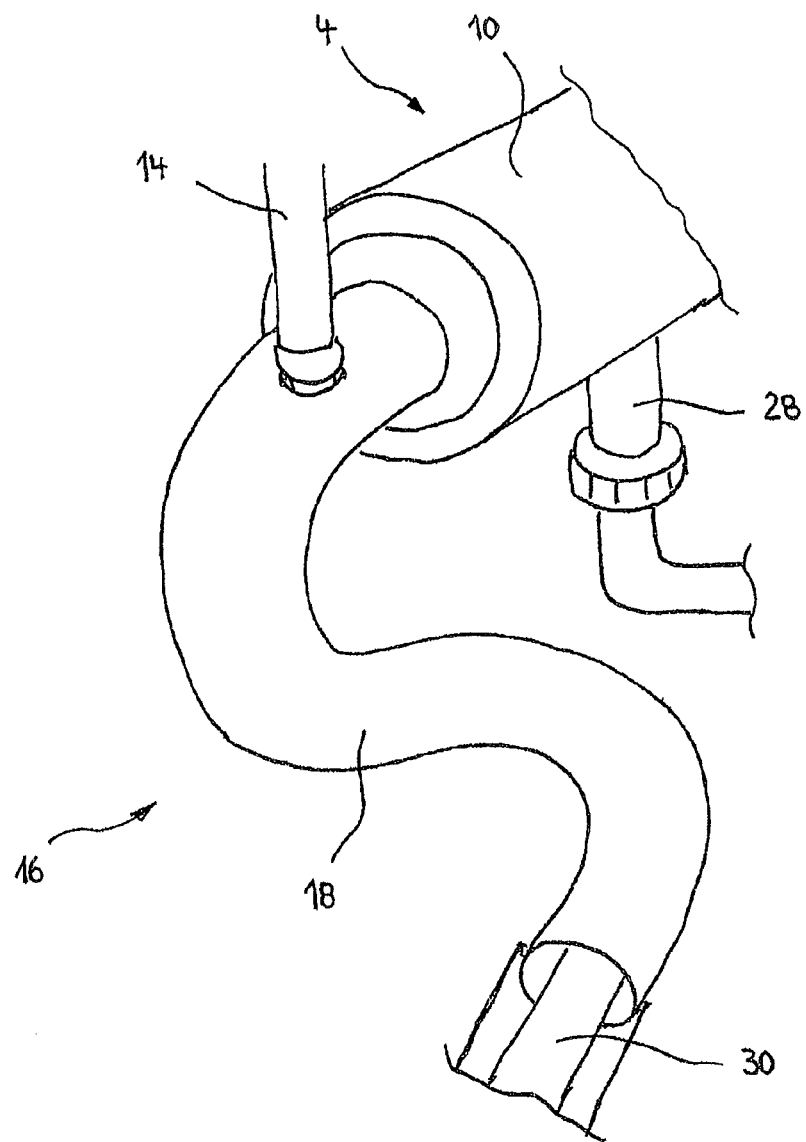
FIG. 4 shows a perspective of a preferred embodiment of the apparatus.

FIG. 4 shows a preferred embodiment of the apparatus 2 according to the invention, which has a deflection device 16 directly connected or coupled to the extrusion head 4. Arranged on the extrusion head 4 is a feed conduit 28, by way of which the casing material to be applied to the sausage string is introduced into the receiving chamber 10 of the extrusion head 4. The deflection device 16 has a pipe conduit portion 18 which, as shown in FIG. 4, is formed from two pipe portions of different curvature configurations. The curvature configurations extend in planes which are substantially perpendicular to each other, wherein each pipe portion has a curvature angle of approximately 180°. In the present embodiment, the pipe conduit portion 18 is preferably in one piece. As can further be seen from FIG. 4 the applicator device 14 is arranged at a spacing downstream of the entry opening of the pipe conduit portion, that corresponds approximately to a tenth of the total length of the pipe conduit portion 18. For further processing, the sausage string 30 issuing from the deflection device 16 at the end is initially moved on in a straight orientation.

The invention claimed is:

1. An apparatus for producing a string from a pasty material, comprising:
    an extrusion head including at least one conveyor conduit configured to shape the pasty material to be shaped into a string and a receiving chamber configured to apply a casing material to the string, the receiving chamber including an entry for the casing material and an exit for applying the casing material to the string surface; and
    a deflection device arranged downstream of the extrusion head in the conveyor direction, the deflection device configured to put the string and the applied casing material into a predetermined curvature, and the deflection device configured to facilitate hardening of the casing material in the curved condition of the string.

2. The apparatus of claim 1 wherein the deflection device has a curved pipe conduit portion.

3. The apparatus of claim 2 wherein the curvature of the pipe conduit portion involves an angle of at least 45°.

4. The apparatus of claim 2 wherein the pipe conduit portion has a coil-shaped or helical configuration.

5. The apparatus of claim 2 wherein the pipe conduit portion includes first and second pipe portions that have curvature configurations extending in approximately mutually perpendicular planes.

6. The apparatus of claim 1 further comprising:
    an applicator device configured to apply an application agent for setting of the casing material to the sausage string, the applicator device being arranged downstream of the extrusion head, wherein the applicator device is arranged along a portion of the deflection device.

7. The apparatus of claim 6 wherein the applicator device is a spray device.

8. The apparatus of claim 6 wherein the applicator device is arranged in the region of the first third of the deflection device.

9. The apparatus of claim 1 wherein the exit of the receiving chamber is associated with an outlet of the conveyor conduit.

10. The apparatus of claim 1 wherein the exit of the receiving chamber is an annular gap extending in an axial direction between an end portion of the conveyor conduit and a wall portion of the receiving chamber, and the annular gap is of an irregular gap dimension in the peripheral direction.

11. The apparatus of claim 1 wherein the conveyor conduit has an outlet and the receiving chamber has an exit, an opening of the outlet and an opening of the exit respectively oriented at an angle less than 90° or greater than 90° relative to a center line of the conveyor conduit.

12. The apparatus of claim 1 further comprising:
a filling machine including a filling hopper configured to receive the pasty material and a delivery pump configured to convey the pasty material to the extrusion head.

13. The apparatus of claim 12 further comprising:
a dividing device configured to divide the shaped string covered with the casing material into individual string portions.

14. A method for producing at least one string of a pasty material, the method comprising:
pressing the pasty material into a string of predetermined length;
covering the string with a casing material;
after the string is covered with the casing material, deflecting the string through a predetermined angle; and
allowing the casing material to harden while the string is deflected.

15. The method of claim 14 wherein the string of pasty material is deflected through an angle of at least 45°.

16. The method of claim 14 further comprising:
applying an application agent for hardening the casing to the string during the deflection procedure,
wherein the application agent is applied to the casing material enclosing the string preferably immediately at the beginning or shortly after the beginning of the string deflection procedure.

17. The method of claim 14 wherein the casing material is applied to the string surface in the peripheral direction of the string with an irregular layer thickness.

18. The method of claim 14 wherein the application agent includes at least a calcium solution.

\* \* \* \* \*